US011190923B2

(12) United States Patent
Lee et al.

(10) Patent No.: US 11,190,923 B2
(45) Date of Patent: Nov. 30, 2021

(54) METHOD FOR TRANSMITTING DATA BASED ON MULTIPLE COMMUNICATION SCHEMES AND ELECTRONIC DEVICE SUPPORTING SAME

(71) Applicant: Samsung Electronics Co., Ltd., Suwon-si (KR)

(72) Inventors: Hyundo Lee, Suwon-si (KR); Hyunkyoung Kim, Suwon-si (KR); Younghak Oh, Suwon-si (KR); Kyusang Ryu, Suwon-si (KR); Sooah Park, Suwon-si (KR); Soyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/082,857

(22) Filed: Oct. 28, 2020

(65) Prior Publication Data
US 2021/0127246 A1 Apr. 29, 2021

(30) Foreign Application Priority Data

Oct. 28, 2019 (KR) .................. 10-2019-0134962

(51) Int. Cl.
*H04W 76/10* (2018.01)
*H04W 4/80* (2018.01)

(52) U.S. Cl.
CPC ............. *H04W 4/80* (2018.02); *H04W 76/10* (2018.02)

(58) Field of Classification Search
CPC ................................. H04W 4/80; H04W 76/10
See application file for complete search history.

(56) References Cited

U.S. PATENT DOCUMENTS 9,678,579 B2 6/2017 Perez et al.
2013/0171981 A1 7/2013 Woo
(Continued)

FOREIGN PATENT DOCUMENTS

KR 101513017 B1 4/2015
KR 20170054922 A 5/2017

OTHER PUBLICATIONS https://www.wi-fi.org/ko/discover-wi-fi/wi-fi-aware Jan. 22, 2020.
(Continued)

*Primary Examiner* — Tuan H Nguyen
(74) *Attorney, Agent, or Firm* — Jefferson IP Law, LLP

(57) ABSTRACT

An electronic device is provided. The device includes a first communication circuit configured to support first wireless communication, a second communication circuit configured to support second wireless communication, a display, and a processor, wherein the processor is configured to perform the first wireless communication with a first external electronic device using the first communication circuit, display a first screen including first information indicating a connection of the first wireless communication with the first external electronic device using the display, perform the second wireless communication with a second external electronic device using the second communication circuit while performing the first wireless communication with the first external electronic device, display a second screen including second information indicating that at least a portion of the first external electronic device is operable by the second external electronic device using the display, receive first data related to the operation of the at least a portion of the first external electronic device from the second external electronic device based on the second wireless communication, generate second data based on the first data, and
(Continued)

transmit the second data to the first external electronic device based on the first wireless communication.

20 Claims, 13 Drawing Sheets

(56) References Cited

U.S. PATENT DOCUMENTS

| | | | | |
|---|---|---|---|---|
| 2014/0073244 A1* | 3/2014 | Ko | ......................... | H04W 4/80 |
| | | | | 455/41.1 |
| 2014/0080469 A1 | 3/2014 | Ko et al. | | |
| 2015/0304800 A1* | 10/2015 | Son | ....................... | H04W 92/18 |
| | | | | 455/41.2 |

OTHER PUBLICATIONS

WWDC 2019 Keynote—Apple, https://youtu.be/psL_5RIBqnY?t=3397.
iOS 13.1 is Out!—What's New? (All changes and features), https://youtu.be/Q6wpobGwvtg?t=306 Sep. 24, 2019.
International Search Report dated Feb. 18, 2021, issued in International Patent Application No. PCT/KR2020/014821.

* cited by examiner

METHOD FOR TRANSMITTING DATA BASED ON MULTIPLE COMMUNICATION SCHEMES AND ELECTRONIC DEVICE SUPPORTING SAME

CROSS-REFERENCE TO RELATED APPLICATION(S)

This application is based on and claims priority under 35 U.S.C. 119(a) of a Korean patent application number 10-2019-0134962, filed on Oct. 28, 2019, in the Korean Intellectual Property Office, the disclosure of which is incorporated by reference herein in its entirety.

BACKGROUND

1. Field

The disclosure relates to a method for transmitting data based on multiple communication schemes, and an electronic device supporting the same.

2. Description of Related Art

Bluetooth communication has been proposed to pair adjacent electronic devices with each other using a radio link in a designated frequency band. Content streaming may be supported between the paired electronic devices based on the Bluetooth communication, and a first electronic device receiving content data may output the content data through a provided interface.

The above information is presented as background information only to assist with an understanding of the disclosure. No determination has been made, and no assertion is made, as to whether any of the above might be applicable as prior art with regard to the disclosure.

SUMMARY

A communication protocol (e.g., Bluetooth communication) operated by a first electronic device paired with a second electronic device may be different from a communication protocol of a third electronic device. Alternatively, even if the first electronic device and the third electronic device mutually operate using the same communication protocol (e.g., Bluetooth communication), the versions may be different. In this case, the Bluetooth communication operating environment of the first electronic device has a limitation of one-to-one communication with a paired second electronic device, and thus the third electronic device may not be able to access the first electronic device based on wireless communication.

Aspects of the disclosure are to address at least the above-mentioned problems and/or disadvantages and to provide at least the advantages described below. Accordingly, an aspect of the disclosure is to provide a method for transmitting data based on multiple communication schemes and an electronic device supporting the same, which can support the access of other electronic devices other than the pairing with respect to a paired electronic device based on Bluetooth communication.

Additional aspects will be set forth in part in the description which follows and, in part, will be apparent from the description, or may be learned by practice of the presented embodiments.

In accordance with an aspect of the disclosure, an electronic device is provided. The electronic device includes a first communication circuit configured to support first wireless communication, a second communication circuit configured to support second wireless communication of a communication protocol different from the first wireless communication, a display, and a processor configured to be operatively connected to the first communication circuit, the second communication circuit, and the display, wherein the processor is further configured to perform the first wireless communication with a first external electronic device using the first communication circuit, display a first screen including first information indicating a connection of the first wireless communication with the first external electronic device using the display, perform the second wireless communication with a second external electronic device using the second communication circuit while performing the first wireless communication with the first external electronic device, display a second screen including second information indicating that at least a portion of the first external electronic device is operable by the second external electronic device using the display, receive first data related to the operation of the at least a portion of the first external electronic device from the second external electronic device based on the second wireless communication, generate second data based on the first data, and transmit the second data to the first external electronic device based on the first wireless communication.

In accordance with another aspect of the disclosure, an electronic device is provided. The electronic device includes a communication circuit configured to support first wireless communication, a display, and a processor configured to be operatively connected to the communication circuit and the display, wherein the processor is further configured to detect a signal transmitted from a first external electronic device performing second wireless communication of a communication protocol different from the first wireless communication by performing signal scanning, display a first screen including an interface capable of requesting access to a second external electronic device performing the second wireless communication with the first external electronic device using the display, perform the first wireless communication with the first external electronic device using the communication circuit, and transmit first data related to the access to the second external electronic device to the first external electronic device based on the first wireless communication.

In accordance with another aspect of the disclosure, a method for transmitting data based on multiple communication schemes which is performed by an electronic device is provided. The method includes performing first wireless communication with a first external electronic device using a first communication circuit supporting the first wireless communication, displaying a first screen including first information indicating a connection of the first wireless communication with the first external electronic device using a display, performing second wireless communication with a second external electronic device using a second communication circuit supporting the second wireless communication of a communication protocol different from the first wireless communication while performing the first wireless communication with the first external electronic device, displaying a second screen including second information indicating that at least a portion of the first external electronic device is operable by the second external electronic device using the display, receiving first data related to the operation of the at least a part of the first external electronic device from the second external electronic device based on the second wireless communication, generating second data based on the first data, and transmitting the second data to the first external electronic device based on the first wireless communication.

According to various embodiments, a communication platform in which other electronic devices can access to an electronic device paired based on Bluetooth communication without a direct communication connection with the electronic device may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
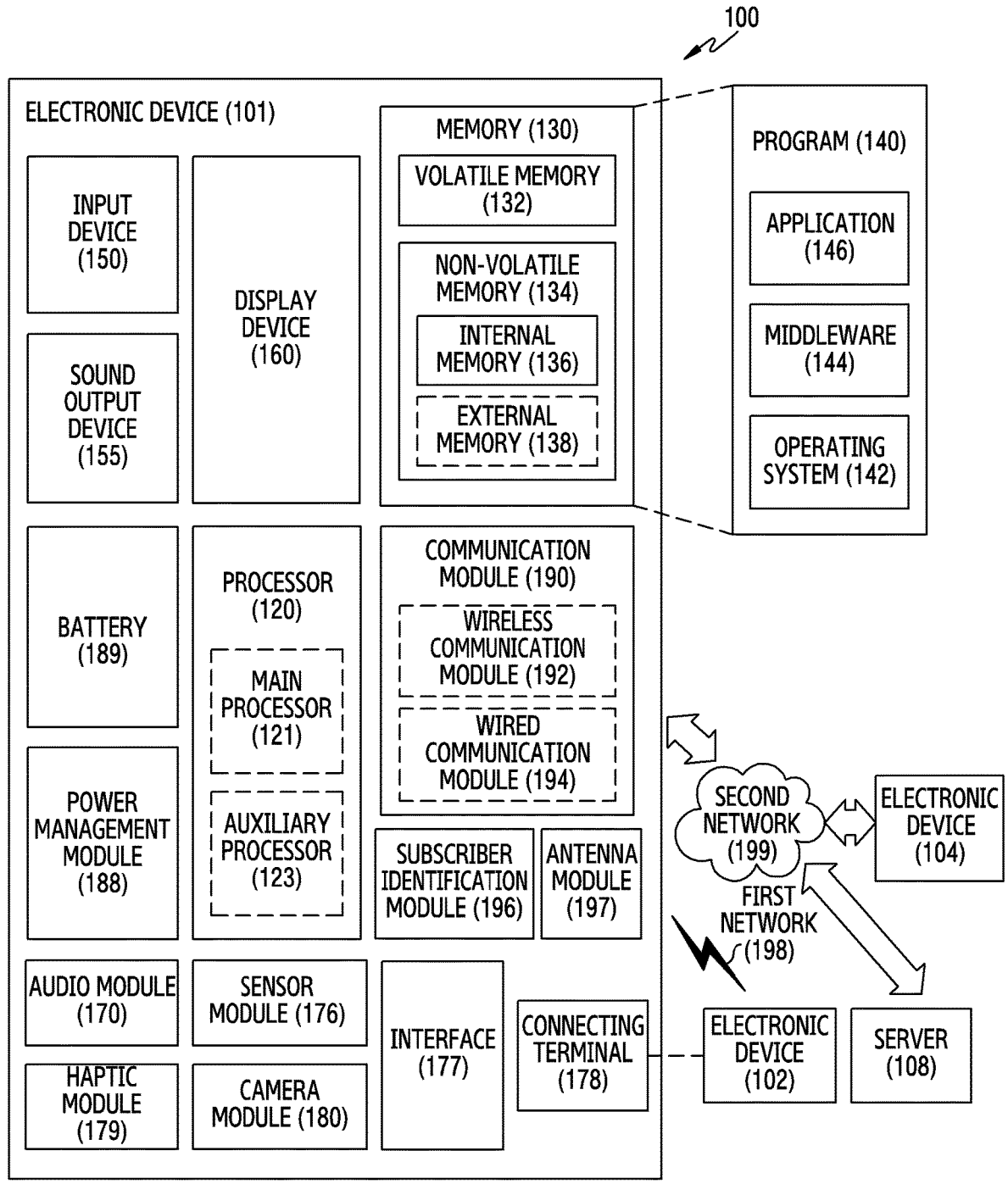
FIG. 1 is a diagram illustrating an electronic device in a network environment according to an embodiment of the disclosure.

FIG. 1 is a diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 described above with reference to FIG. 1 may correspond to a first electronic device or a third electronic device referred to in other drawings below.

Figure 2:
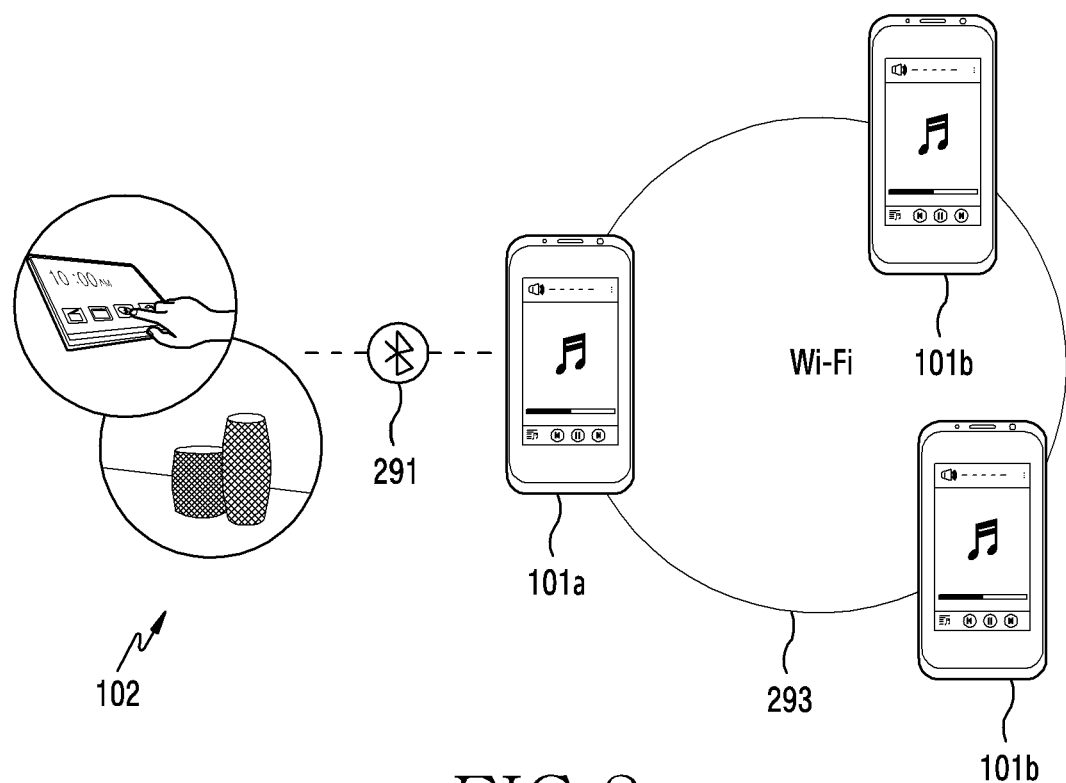
FIG. 2 is a diagram illustrating an example of the operation of an electronic device according to an embodiment of the disclosure.

FIG. 2 is a diagram illustrating an example of the operation of an electronic device according to an embodiment of the disclosure.

Referring to FIG. 2, a first electronic device 101a may be connected to an adjacent second electronic device 102 within a designated distance range through first wireless communication 291 (e.g., Bluetooth communication) according to a short-range wireless communication protocol, and may interact with a second electronic device 102 based on the first wireless communication 291. For example, the first electronic device 101a may use the first wireless communication 291 to transmit content data according to multimedia content (e.g., video content and/or audio content) included in the first electronic device 101a to the second electronic device 102. Alternatively, the first electronic device 101a may transmit control data for controlling a function supported by the second electronic device 102 or at least a portion of multimedia content included in the second electronic device 102 to the second electronic device 102 using the first wireless communication 291. In response to data reception from the first electronic device 101a, the second electronic device 102 may execute at least a portion of a function indicated by the data or may output at least a portion of the data through an interface (e.g., speaker and/or display) included in the second electronic device 102.

According to various embodiments, the second electronic device 102 may include various types of devices capable of establishing the first wireless communication 291 with the first electronic device 101a. For example, the second electronic device 102 may include at least one of an input/output device (e.g., speaker device, display device, wireless earphone device, wireless headset device, wearable device, and/or beam projector device) capable of processing data received from the first electronic device 101a and outputting related content or executing a function, an Internet of Things (IoT) device (e.g., artificial intelligence speaker device, security device, sensing device, and/or home appliance), and a system device (e.g., audio video navigation (AVN) system device and/or in-vehicle information (IVI) system device) mounted in a center fascia of a vehicle. According to various embodiments, the second electronic device 102 may include a device (e.g., a car kit and/or aux) that supports wired communication connection with the first electronic device 101a. However, as long as the second electronic device 102 can operate (e.g., content output and/or designated function execution) based on the first wireless communication 291 with the first electronic device 101a, the second electronic device 102 is not limited to the above-described devices.

In one embodiment, the first electronic device 101a may be connected to at least one adjacent third electronic device 101b within a designated distance range through a second wireless communication 293 (e.g., Wi-Fi communication) that is a short-range wireless communication protocol different from the first wireless communication 291. For example, the first electronic device 101a may perform the second wireless communication 293 with the at least one third electronic device 101b while maintaining a connection of the first wireless communication 291 with the second electronic device 102. The second wireless communication 293 is illustrated as Wi-Fi communication, but various short-range wireless communication protocols (e.g., infrared data association (IrDA)) that can be established between the first electronic device 101a and the at least one third electronic device 101b can be applied. Alternatively, the first electronic device 101a and the at least one third electronic device 101b may perform wired communication using a wired cable (e.g., a USB cable and/or an HDMI cable).

According to various embodiments, as the short-range wireless communication protocol used among the above-described first electronic device 101a, second electronic device 102, and at least one third electronic device 101b, low power wide area (LPWA)-based various IoT protocols (e.g., LoRaWan, NB-IOT, and/or LTE-M) in addition to the first wireless communication 291 (e.g., Bluetooth communication) and the second wireless communication 293 (e.g., Wi-Fi communication) may be applied.

Regarding the above-description, each of the first electronic device 101a and the at least one third electronic device 101b may include a wireless communication module (e.g., the wireless communication module 192 of FIG. 1) supporting short-range wireless communication. The wireless communication module 192 included in the first electronic device 101a may include a first communication circuit that supports the first wireless communication 291 with the second electronic device 102 and a second communication circuit that supports the second wireless communication 293 with the at least one third electronic device 101b. According to various embodiments, the first communication circuit and the second communication circuit may be configured independently of each other or may be configured as one integrated communication circuit.

In one embodiment, the first electronic device 101a may relay access of the at least one third electronic device 101b to the second electronic device 102 based on establishment of the first wireless communication 291 with the second electronic device 102 and establishment of the second wireless communication 293 with the at least one third electronic device 101b. From a similar point of view, the at least one third electronic device 101b may access the second electronic device 102 through the first electronic device 101a without direct pairing with the second electronic device 102 (e.g., pairing based on the first wireless communication 291). For example, the at least one third electronic device 101b may transmit first data for operating the second electronic device 102 to the first electronic device 101a by using the second wireless communication 293, and the first electronic device 101a may transmit second data corresponding to the first data to the second electronic device 102 by using the first wireless communication 291. In one embodiment, the second electronic device 102 may process the second data to perform the related operation.

Alternatively, the first electronic device 101a may relay access of the at least one third electronic device 101b to the second electronic device 102 based on establishment of first wired communication with the second electronic device 102 (e.g., car kit and/or aux) through a wired cable and establishment of the second wireless communication 293 with the at least one third electronic device 101b. For example, the first electronic device 101a may receive first data from the at least one third electronic device 101b using the second wireless communication 293, and may transmit second data generated to correspond to the first data to the second electronic device 102 through the first wired communication based on the wired cable.

Figure 3:
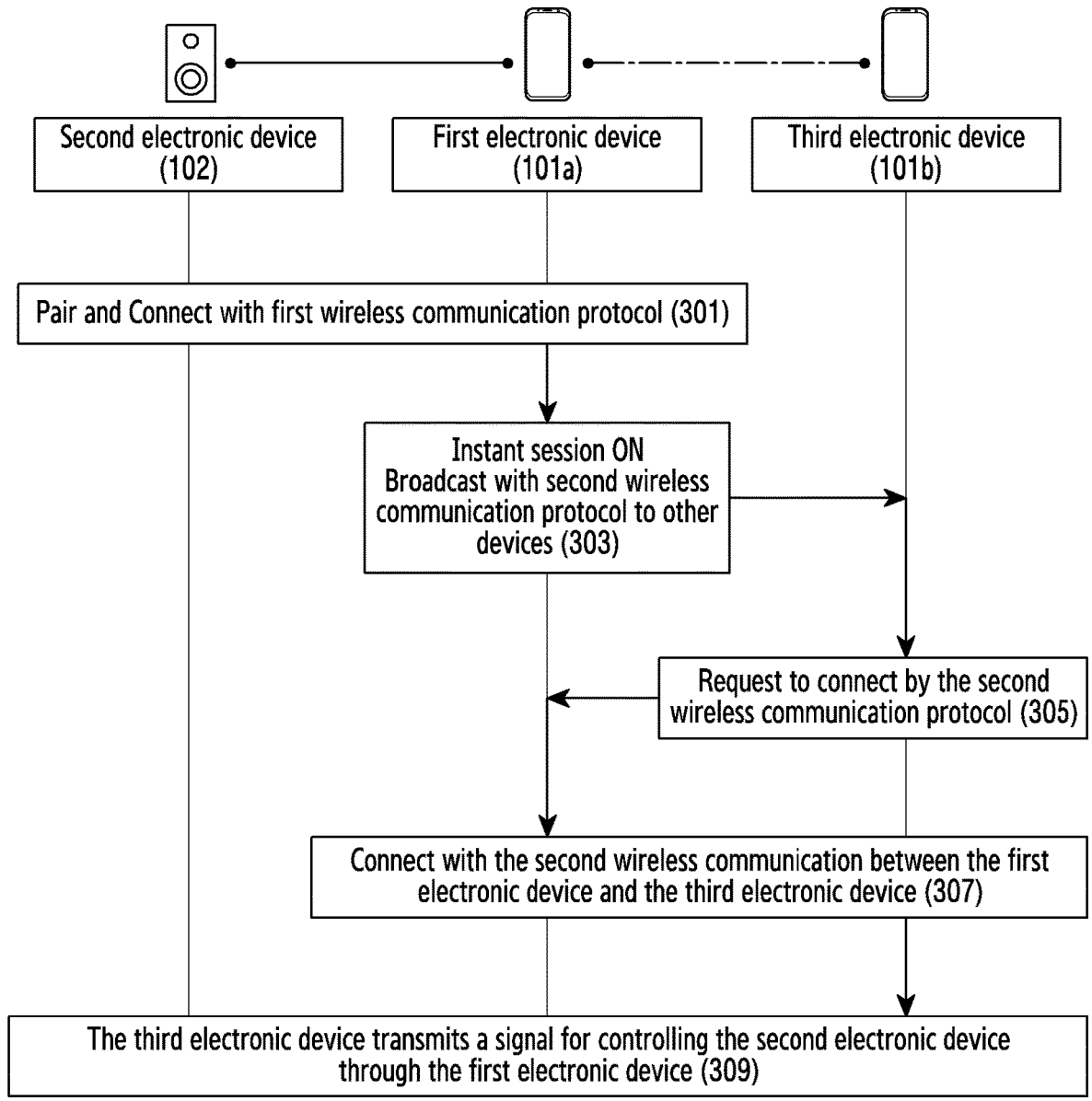
FIG. 3 is a diagram illustrating an operation flow among a first electronic device, a second electronic device, and a third electronic device according to an embodiment of the disclosure.

FIG. 3 is a diagram illustrating an operation flow among a first electronic device, a second electronic device, and a third electronic device according to an embodiment of the disclosure.

Figure 4:
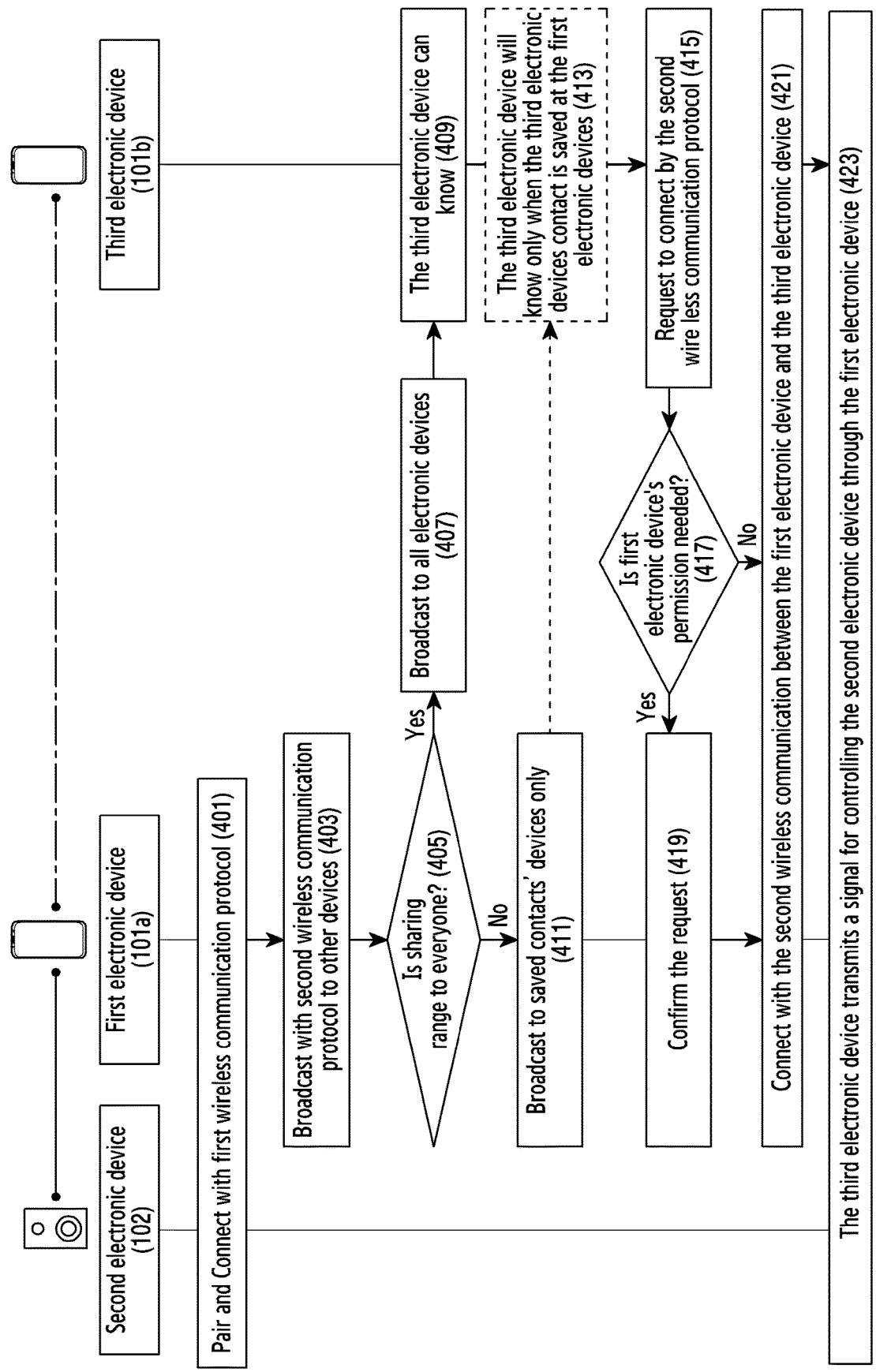
FIG. 4 is a diagram illustrating another operation flow among a first electronic device, a second electronic device, and a third electronic device according to an embodiment of the disclosure.

FIG. 4 is a diagram illustrating another operation flow among a first electronic device, a second electronic device, and a third electronic device according to an embodiment of the disclosure.

The operations of a first electronic device (e.g., the first electronic device 101a of FIG. 2) and at least one third electronic device (e.g., the at least one third electronic device 101b of FIG. 2) mentioned in FIGS. 3 and 4 may be performed under the control of a main processor (e.g., the main processor 121 of FIG. 1 or an application processor) included in each of the first electronic device 101a and the at least one third electronic device 101b. Alternatively, the operations of the first electronic device 101a and the at least one third electronic device 101b may be performed under the control of an auxiliary processor (e.g., the auxiliary processor 123 of FIG. 1 of a communication processor) of each of the first electronic device 101a and the at least one third electronic device 101b which are operated independently from the main processor 121.

Referring to FIG. 3, in operation 301, the first electronic device 101a and the second electronic device 102 may be paired through first wireless communication (e.g., Bluetooth communication). For example, when a first wireless communication function is activated on the first electronic device 101a, the first electronic device 101a may search for a peripheral device to display at least one external electronic device supporting the first wireless communication function (e.g., display through the display device 160 of FIG. 1), and may establish (e.g., pair) the first wireless communication with the second electronic device 102 selected according to a user input. In this operation, the first electronic device 101a may use the first wireless communication established with the second electronic device 102 to acquire at least one piece of identification information (e.g., model information, version information, and/or operating system information).

In one embodiment, the first electronic device 101a may operate the second electronic device 102 by using the first wireless communication. For example, in order for content included in the first electronic device 101a to be output from the second electronic device 102, the first electronic device 101a may transmit data related to the content to the second electronic device 102. Alternatively, the first electronic device 101a may transmit data for controlling at least a part of a function or content included in the second electronic device 102 to the second electronic device 102. In response to receiving data from the first electronic device 101a, the second electronic device 102 may output and/or control content corresponding to the data, or may execute a function corresponding to the data.

In operation 303, the first electronic device 101a may execute (or activate) a designated function in response to a user input. For example, the first electronic device 101a may execute the designated function capable of relaying access of at least one external electronic device to the second electronic device 102 paired with the first electronic device 101a through first wireless communication. In the following description or drawings, the designated function may be named or illustrated as an instant session function.

In one embodiment, the first electronic device 101a may advertise the second electronic device 102 connected through the first wireless communication in response to the execution (or activation) of the instant session function. For example, the first electronic device 101a may activate a second wireless communication (e.g., Wi-Fi communication) function, which is a short-range wireless communication protocol different from the first wireless communication, and may use the second wireless communication to transmit an advertising signal including identification information of the second electronic device 102 and identification information of the first electronic device 101a according to a scheduled period. In various embodiments, the first electronic device 101a may activate a third wireless communication (e.g., Bluetooth low energy (BLE) communication) function, which is a short-range wireless communication protocol different from the first wireless communication and the second wireless communication, and may use the third wireless communication to transmit a signal advertising the second electronic device 102.

In operations 305 and 307, the at least one third electronic device 101b may request a second wireless communication connection from the first electronic device 101a, and may establish the second wireless communication with the first electronic device 101a. For example, the at least one third electronic device 101b may detect a signal transmitted by the first electronic device 101a by performing signal scanning, and may recognize the second electronic device 102 and the first electronic device 101a based on the identification information of each of the second electronic device 102 and the first electronic device 101a included in the signal. In one embodiment, the at least one third electronic device 101b may display (e.g., display through the display device 160 of FIG. 1) a message including the identification information of each of the second electronic device 102 and the first electronic device 101a in response to the signal detection, and may transmit, to the first electronic device 101a, a signal including a request for establishing the second wireless communication with the first electronic device 101a in response to a user input to the message. The at least one third electronic device 101b may be connected to the first electronic device 101a through the second wireless communication by receiving an ack of the first electronic device 101a for the request.

In operation 309, data (or signal) transmission from the at least one third electronic device 101b to the second electronic device 102 may be performed through the first electronic device 101a. For example, the at least one third electronic device 101b may transmit first data for operating the second electronic device 102 connected to the first electronic device 101a through the first wireless communication, to the first electronic device 101a by using the second wireless communication. The first electronic device 101a may transmit second data corresponding to the first data to the second electronic device 102 by using the first wireless communication.

According to various embodiments, the first data may include data for at least partially controlling content of the first electronic device 101a being output by the second electronic device 102 or content of the second electronic device 102 itself. As another example, the first data may include data for controlling at least a part of a function being executed by the second electronic device 102. As another example, the first data may include data for outputting content included in the at least one third electronic device 101b to the second electronic device 102.

In various embodiments, the second data may be generated by the first electronic device 101a in a data format of a specification identified or processed by the second electronic device 102, and may include information resources according to the first data. The second data may be stored in, for example, in a volatile region (e.g., the volatile memory 132 of FIG. 1) of a memory (e.g., the memory 130 of FIG. 1) included in the first electronic device 101a, and may be removed from the volatile region according to the lapse of a designated time after the transmission to the second electronic device 102 is completed.

In one embodiment, the second electronic device 102 may process the second data received from the first electronic device 101a to reflect it on the content being output, to output other content corresponding to the second data, or to execute a function related to the second data.

Referring to FIG. 4, operations 401 and 403 may respectively correspond to operations 301 and 303 described above with reference to FIG. 3. For example, in operations 401 and 403, the first electronic device 101a and the second electronic device 102 may be paired through first wireless communication (e.g., Bluetooth communication), and the first electronic device 101a may advertise the second electronic device 102 using second wireless communication (e.g., Wi-Fi communication) according to the execution (or activation) of the instant session function.

Operations 405, 407, 409, 411, and 413 to be described below may represent operations branched according to a designated condition when operation 403 related to the advertisement of the second electronic device 102 is performed.

In operation 405, when transmitting a signal including the identification number of each of the second electronic device 102 and the first electronic device 101a using the second wireless communication, the first electronic device 101a may identify a first condition configured in the first electronic device 101a. According to one embodiment, the first condition may be related to a sharing range (e.g., an access allowed range) for the second electronic device 102 paired with the first electronic device 101a through the first wireless communication. For example, the first condition on the first electronic device 101a may be configured so that the second electronic device 102 can be shared (or accessed) with all external electronic devices, or the second electronic device 102 can be configured to be shared (or accessed) only with an external electronic device in which identification information (e.g., contact information and/or user information) is stored in the first electronic device 101a.

In one embodiment, when the first condition is configured so that the second electronic device 102 is shared with all external electronic devices, in operations 407 and 409, the first electronic device 101a may transmit the signal including the identification number of each of the second electronic device 102 and the first electronic device 101a using the second wireless communication, and the at least one third electronic device 101b may detect the signal to recognize the second electronic device 102 and the first electronic device 101a.

In one embodiment, when the first condition is configured so that the second electronic device 102 is shared only with a designated external electronic device (e.g., an external electronic device of which identification information is stored in the first electronic device 101a), in operations 411 and 413, the first electronic device 101a may encrypt the signal including the identification information of each of the second electronic device 102 and the first electronic device 101a in a form that can be decrypted by the designated external device to transmit the encrypted signal, and the at least one third electronic device 101b may recognize the second electronic device 102 and the first electronic device 101a through the decryption of the signal only in the case corresponding to the designated external electronic device. According to various embodiments, the signal decryption of the at least one third electronic device 101b may be performed based on a designated data packet shared between the at least one third electronic device 101b and the first electronic device 101a.

Alternatively, the signal decryption of the at least one third electronic device 101b may be performed through a designated server. For example, the at least one third electronic device 101b may transmit the encrypted signal to the designated server, and the server may decrypt the encrypted signal according to whether the at least one third electronic device 101b satisfies a designated condition. For example, the server may include identification information (e.g., contact information, model information, version information, and/or user information of the external electronic device) of at least one external electronic device stored in the first electronic device 101a. In addition, when the at least one third electronic device 101b corresponds to the identification information, the encrypted signal may be decrypted and provided to the at least one third electronic device 101b.

In operation 415, the at least one third electronic device 101b that recognizes the second electronic device 102 and the first electronic device 101a may display (e.g., display through the display device 160 of FIG. 1) a message including the identification of the second electronic device 102 and the first electronic device 101a, and may transmit a signal including a request for establishing the second wireless communication with the first electronic device 101a to the first electronic device 101a in response to a user input to the message.

According to one embodiment, a second wireless communication connection between the at least one third electronic device 101b and the first electronic device 101a according to the request may be performed in a different process according to a second condition configured in the first electronic device 101a. The second condition may be related to a user's approval of the first electronic device 101a, for example, in the second wireless communication connection between the first electronic device 101a and the external electronic device. For example, the second condition on the first electronic device 101a may be configured so that the user's approval is required when the second wireless communication connection with the external electronic device is made, or may be configured so that the user's approval is not required when the second wireless communication connection with the external electronic device is made.

In one embodiment, when the second wireless communication connection with the external electronic device is made, the second condition may be configured so that the user's approval of the first electronic device 101a is required. In this case, in operations 417, 419, and 421, the first electronic device 101a may display a message inquiring whether to allow the access of the at least one third electronic device 101b to the second electronic device in response to reception of a signal (e.g., a signal including a request for the second wireless communication connection) from the at least one third electronic device 101b, and may transmit an ack to the at least one third electronic device 101b in response to a user input to the message, thereby establishing the second wireless communication with the at least one third electronic device 101b.

In another embodiment, when the second wireless communication connection with the external electronic device is made, the second condition may be configured so that the user's approval of the first electronic device 101a is not required. In this case, in operations 417 and 421, the first electronic device 101a may transmit an ack to the at least one third electronic device 101b in response to reception of the signal (e.g., the signal including the request for the second wireless communication connection) from the at least one third electronic device 101b, thereby establishing the second wireless communication with the at least one third electronic device 101b.

Operation 423 may correspond to operation 309 described above with reference to FIG. 3. For example, the at least one third electronic device 101b may transmit the first data for operating the second electronic device 102 connected to the first electronic device 101a through the first wireless communication, to the first electronic device 101a using the second wireless communication. The first electronic device 101a may generate the second data corresponding to the first data, and may transmit the second data to the second electronic device 102 using the first wireless communication. In one embodiment, the second electronic device 102 may process the second data received from the first electronic device 101a to reflect it on the content being output, to output other content corresponding to the second data, or to execute the function related to the second data.

Figure 5:
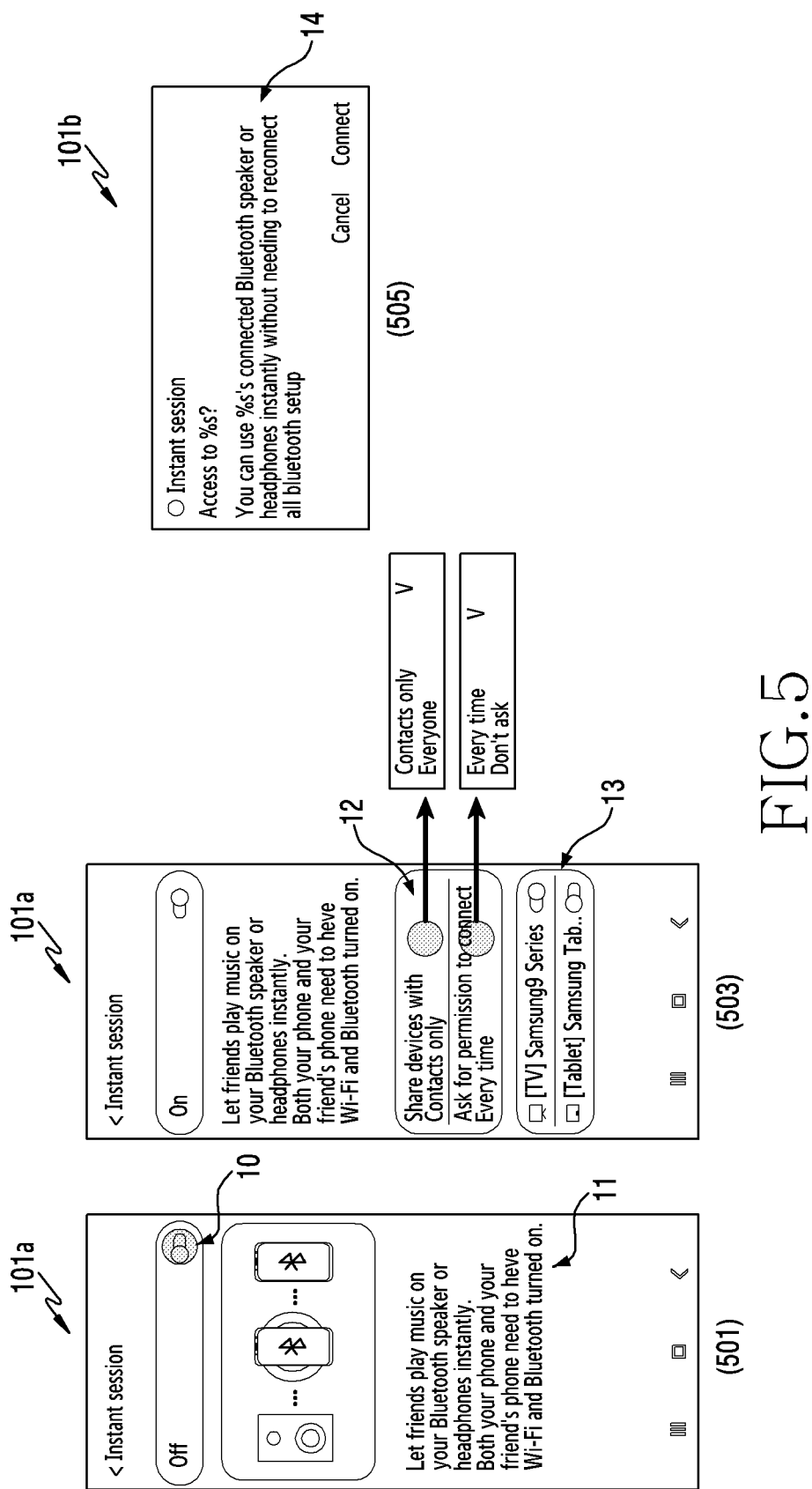
FIG. 5 is a diagram illustrating a form of activating an instant session function of a first electronic device according to an embodiment of the disclosure.

FIG. 5 is a diagram illustrating a form of activating an instant session function of a first electronic device according to an embodiment of the disclosure.

Figure 6:
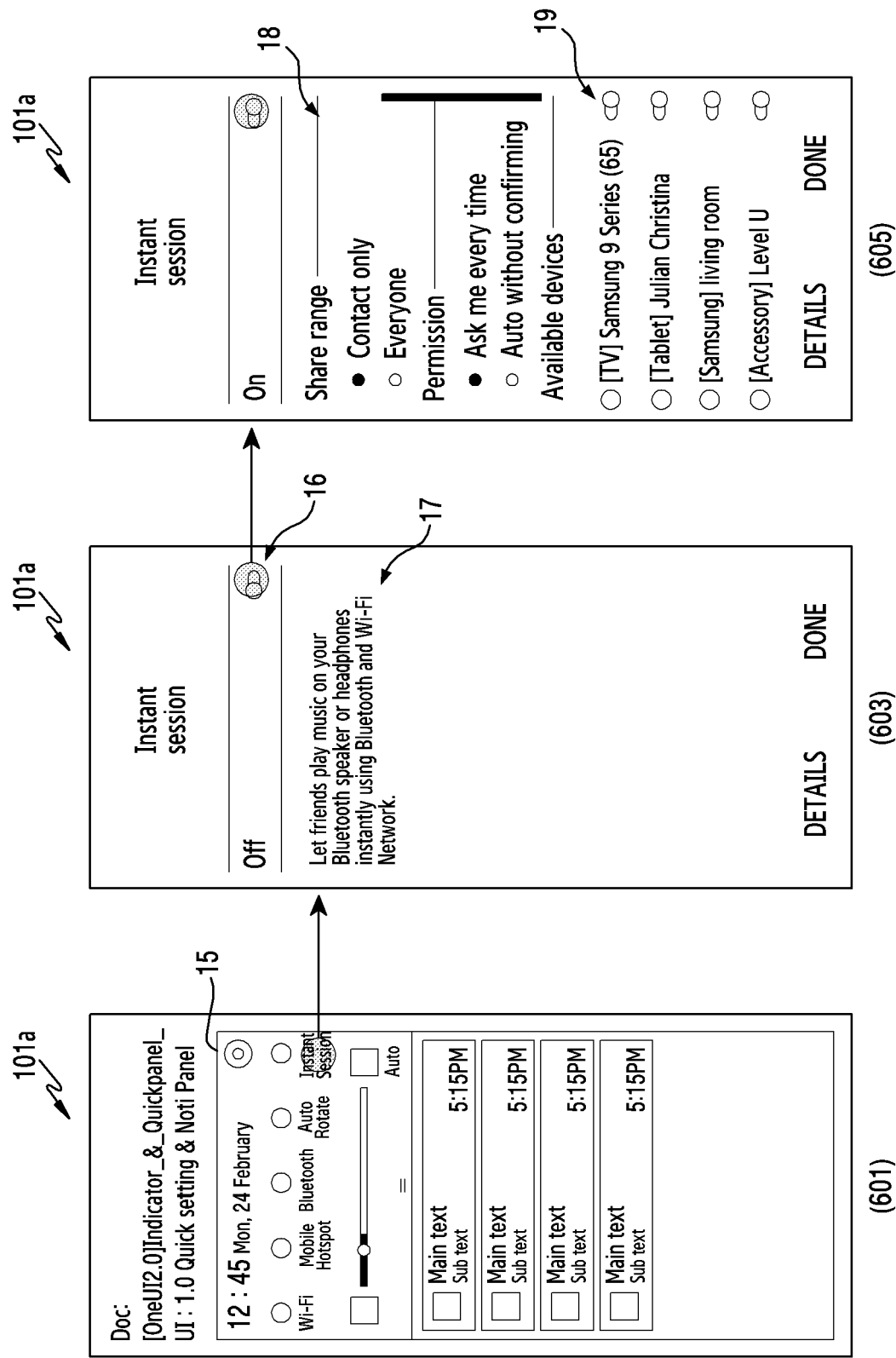
FIG. 6 is a diagram illustrating another form of activating an instant session function of a first electronic device according to an embodiment of the disclosure.

FIG. 6 is a diagram illustrating another form of activating an instant session function of a first electronic device according to an embodiment of the disclosure.

Referring to FIG. 5, the first electronic device 101a may display a screen related to system configuration (or communication function setting) of the first electronic device 101a using a display (e.g., the display device 160 in FIG. 1), and may enter a first screen 501 according to user control on the screen. According to an embodiment, the first screen 501 may be related to an instant session function capable of relaying access of at least one third electronic device (e.g., the third electronic device 101b of FIG. 1, 2, or 3) to a second electronic device (e.g., the second electronic device 102 of FIG. 2, 3, or 4) paired with the first electronic device 101a through first wireless communication (e.g., Bluetooth communication). For example, the first screen 501 may include a software button 10 capable of controlling whether to execute (or activate) the instant session function and text 11 indicating operation information of the instant session function.

In one embodiment, when receiving a user input to the software button 10, the first electronic device 101a may execute (or activate) the instant session function, and may display a second screen 503 by switching the first screen 501 to the second screen 503 or changing at least a portion of the first screen 501. According to an embodiment, the second screen 503 may include a first interface 12 that can configure a first condition related to a shared range (or an access allowed range) for the second electronic device 102 paired with the first electronic device 101a through the first wireless communication and a second condition related to a user's approval when a connection of second wireless communication (e.g., Wi-Fi communication) between the first electronic device 101a and the at least one third electronic device 101b is made. In addition, the second screen 503 may include a second interface 13 that displays identification information of at least one external electronic device (e.g., the second electronic device 102) having a history indicating that the at least one external electronic device is connected to the first electronic device 101a through the first wireless communication.

As described above, in response to the execution (or activation) of the instant session function, the first electronic device 101a may advertise the second electronic device 102 connected through the first wireless communication. For example, the first electronic device 101a may activate a second wireless communication function, and may transmit a signal including identification information of the second electronic device 102 and identification information of the first electronic device 101a using the second wireless communication. In this regard, the at least one third electronic device 101b that receives the signal transmitted from the first electronic device 101a may display a third screen 505 using a display (e.g., the display device 160 of FIG. 1). For example, the at least one third electronic device 101b may recognize the second electronic device 102 and the first electronic device 101a based on the identification information included in the signal transmitted from the first electronic device 101a, and may generate a message 14 inquiring access to the second electronic device 102 through the first electronic device 101a to display the generated message 14 on the third screen 505.

Referring to FIG. 6, the first electronic device 101a may display a fourth screen 601 capable of supporting entry to a screen related to the instant session function in response to user control. The fourth screen 601 may include, for example, a quick panel 15 or a floating button that is always displayed, and the quick panel 15 or the floating button may include an image (e.g., icon) and/or text related to the instant session function.

In one embodiment, when receiving a user input for the image (e.g., icon) and/or text related to the instant session function, the first electronic device 101a may switch the fourth screen 601 to a fifth screen 603. In one embodiment, the fifth screen 603 may correspond to the first screen (e.g., the first screen 501 of FIG. 5) described above through FIG. 5. For example, the fifth screen 603 may include a software button 16 for controlling whether to execute (or activate) the instant session function and text 17 indicating operation information of the instant session function.

In one embodiment, the first electronic device 101a may execute (or activate) the instant session function by receiving a user input to the software button 16, and may display a sixth screen 605 by switching the fifth screen 603 to the sixth screen 605 or changing at least a portion of the fifth screen 603. In one embodiment, the sixth screen 605 may correspond to the second screen (e.g., the second screen 503 of FIG. 5) described above through FIG. 5. For example, the sixth screen 605 may include a third interface 18 that can configure a first condition related to a shared range (or access allowed range) for a second electronic device (e.g., the second electronic device 102 of FIG. 2, 3, or 4) paired with the first electronic device 101a through first wireless communication (e.g., Bluetooth communication) and a second condition related to a user's approval when a connection of second wireless communication (e.g., Wi-Fi communication) between the first electronic device 101a and at least one third electronic device (e.g., the third electronic device 101b of FIG. 2, 3, or 4). In addition, the sixth screen 605 may include a fourth interface 19 that displays identification information of at least one external electronic device (e.g., the second electronic device 102) having a history indicating that the at least one external electronic device is connected to the first electronic device 101a through the first wireless communication.

Figure 7:
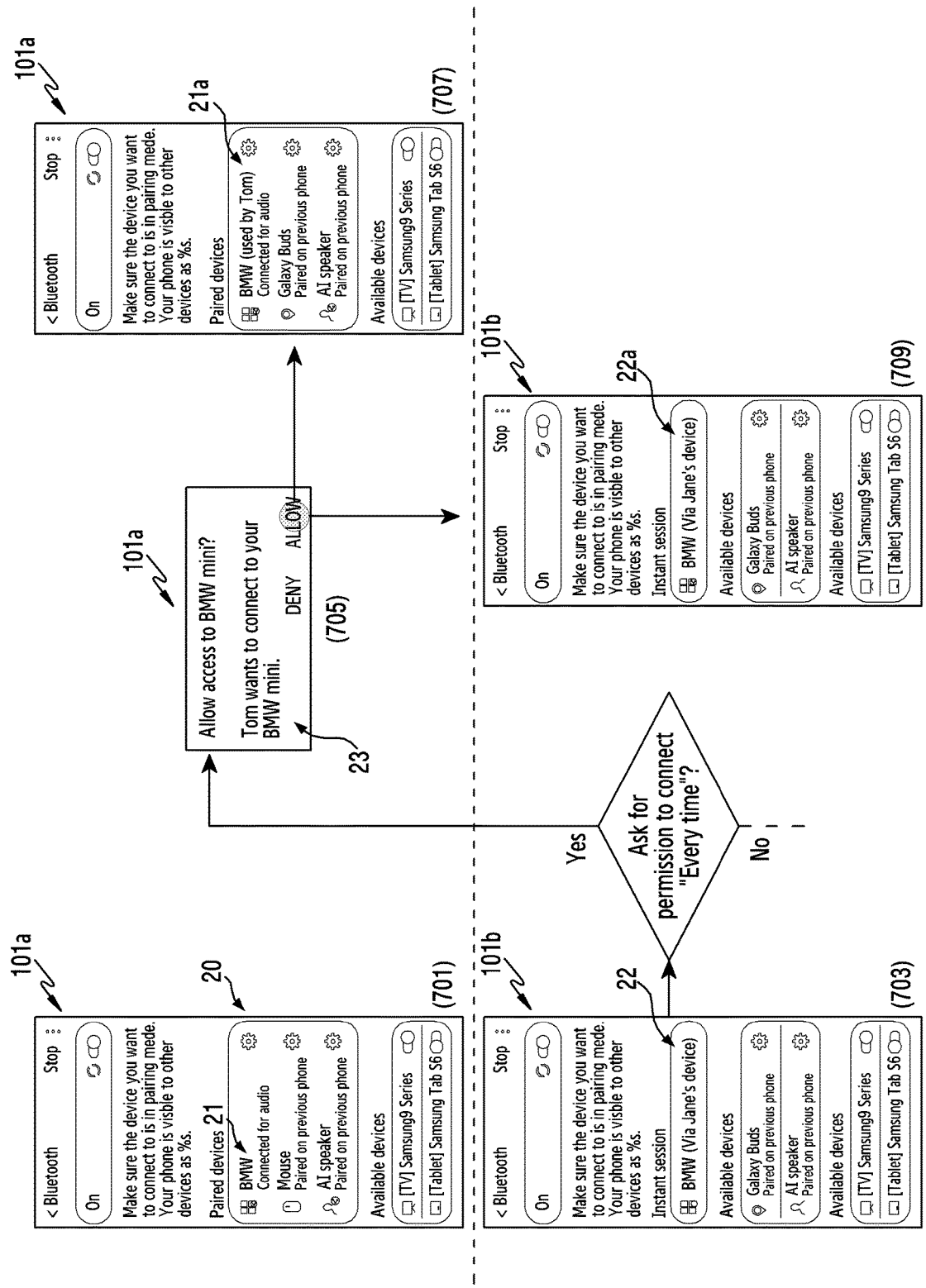
FIG. 7 is a diagram illustrating a screen output by a first electronic device and a third electronic device according to a condition configured for an instant session function of the first electronic device according to an embodiment of the disclosure.

FIG. 7 is a diagram illustrating a screen output by a first electronic device and a third electronic device according to a condition configured for an instant session function of the first electronic device according to an embodiment of the disclosure.

Figure 8:
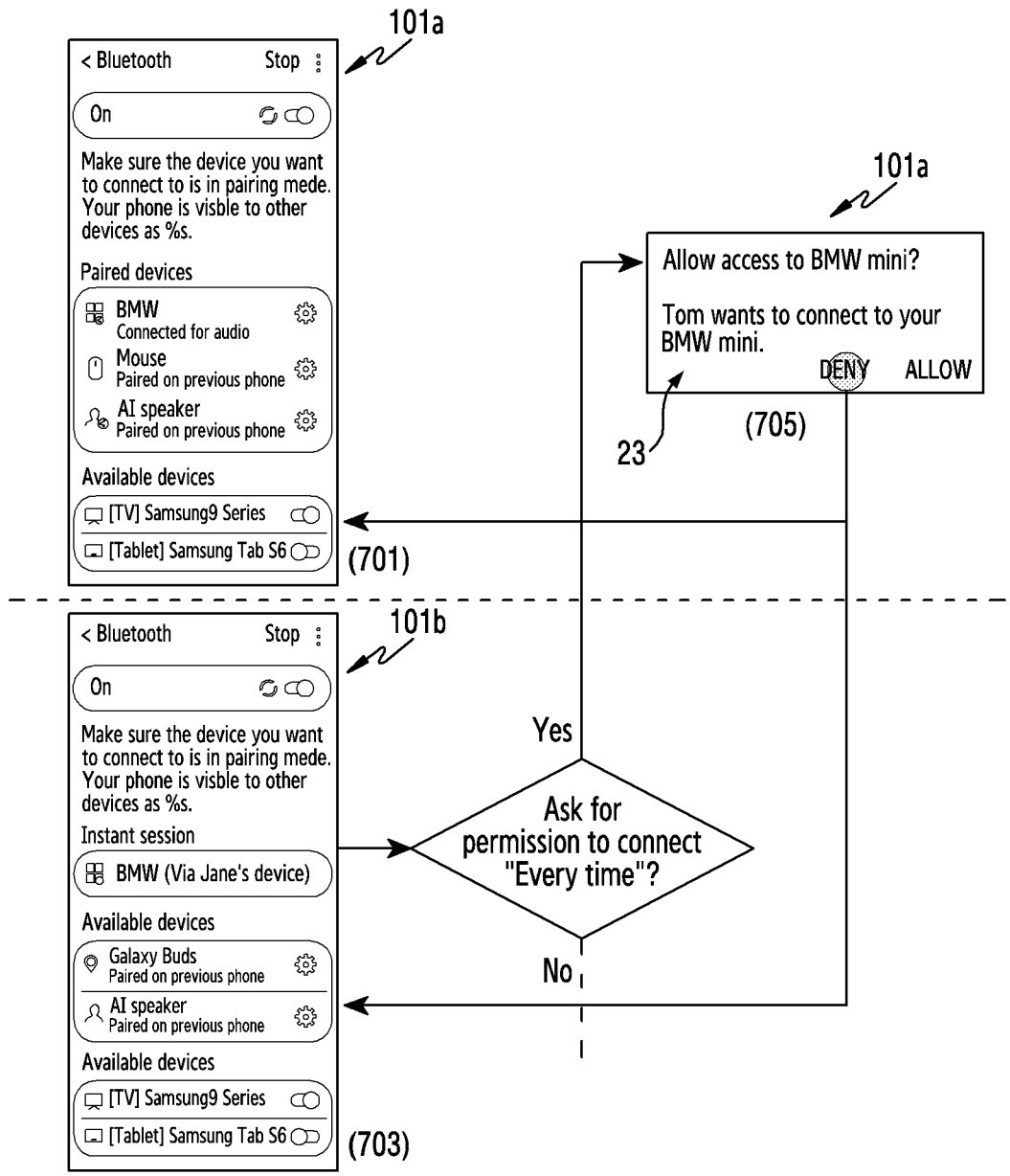
FIG. 8 is a diagram illustrating another screen output by a first electronic device and a third electronic device according to a condition configured for an instant session function of the first electronic device according to an embodiment of the disclosure.

FIG. 8 is a diagram illustrating another screen output by a first electronic device and a third electronic device according to a condition configured for an instant session function of the first electronic device according to an embodiment of the disclosure.

Figure 9:
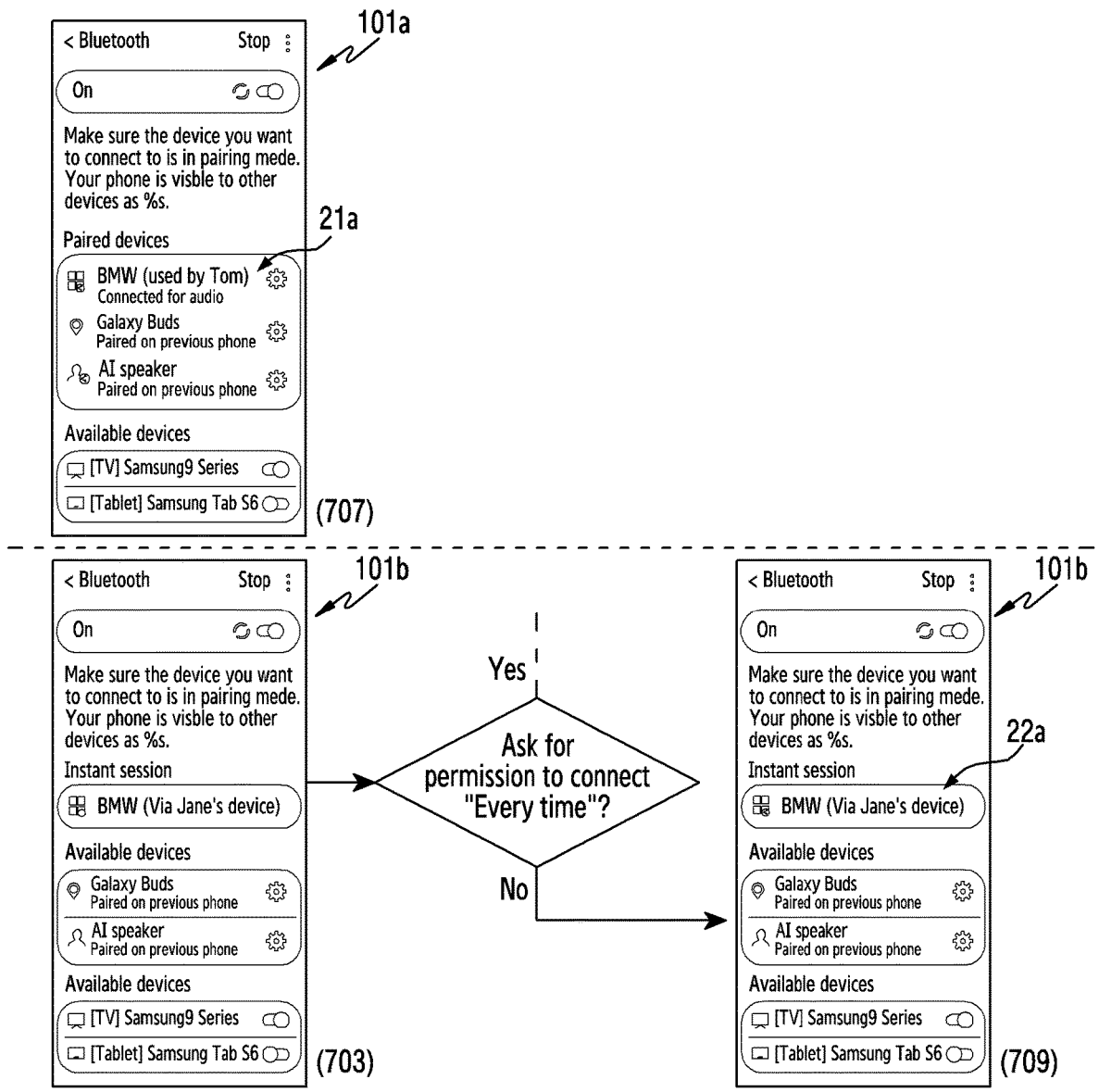
FIG. 9 is a diagram illustrating another screen output by a first electronic device and a third electronic device according to a condition set for an instant session function of the first electronic device according to an embodiment of the disclosure.

FIG. 9 is a diagram illustrating another screen output by a first electronic device and a third electronic device according to a condition set for an instant session function of the first electronic device according to an embodiment of the disclosure.

Referring to FIGS. 7 and 8, the first electronic device 101a and the at least one third electronic device 101b may respectively display a seventh screen 701 and an eighth screen 703 related to configuration of a first wireless communication (e.g., Bluetooth communication) function by using a display (e.g., the display device 160 of FIG. 1). In one embodiment, the seventh screen 701 may include a fifth interface 20 that displays identification information of at least one external electronic device (e.g., the second electronic device 102 of FIG. 2, 3, or 4) having a history indicating that the at least one external electronic device is connected to the first electronic device 101a through the first wireless communication. According to various embodiments, on the fifth interface 20, identification information 21 of the external electronic device currently paired with the first electronic device 101a through the first wireless communication may be displayed with a first effect (e.g., color, flashing, and/or highlight). According to various embodiments, the seventh screen 701 may further display identification information of the at least one external electronic device (e.g., the second electronic device 102) having no connection history with the first electronic device 101a through the first wireless communication. When any one of the at least one external electronic device without the connection history is selected according to a user input and is connected to the first electronic device 101a through the first wireless communication, identification information of the selected external electronic device may be processed with the first effect and may be displayed in the fifth interface 20.

In one embodiment, the eighth screen 703 may include a sixth interface 22 that can request access to the second electronic device 102 through the first electronic device 101a as the at least one third electronic device 101b detects an advertisement signal (e.g., a signal advertising the second electronic device 102 currently paired with the first electronic device 101a through the first wireless communication) transmitted from the first electronic device 101a. According to various embodiments, the fact that the sixth interface 22 is included in the eighth screen 703 related to the configuration of the first wireless communication function of the at least one third electronic device 101b may indicate that the at least one third electronic device 101b can be indirectly or logically paired with the second electronic device 102 through the first electronic device 101a. In one embodiment, the sixth interface 22 may be displayed with a second effect (e.g., black and white, non-flashing, and/or blur) according to a condition in which the at least one third electronic device 101b is not currently connected to the first electronic device 101a through second wireless communication (e.g., Wi-Fi communication).

According to an embodiment, the at least one third electronic device 101b may transmit, to the first electronic device 101a, a signal including a request for establishing the second wireless communication with the first electronic device 101a in response to a user input to the sixth interface 22. Alternatively, the at least one third electronic device 101b may transmit the signal including the request for establishing the second wireless communication with the first electronic device 101a according to a user input for a message (e.g., 14 of FIG. 5) displayed when the advertisement signal transmitted from the first electronic device 101a is detected, in addition to the user input to the sixth interface 22.

In one embodiment, when the second condition is configured so that a user's approval of the first electronic device 101a is required when a second wireless communication connection with an external electronic device on the first electronic device 101a is made, the first electronic device 101a may display a ninth screen 705 in response to reception of a request signal transmitted from the at least one third electronic device 101b. According to an embodiment, the ninth screen 705 may include a message inquiring whether to allow the access of the at least one third electronic device 101b to the second electronic device 102 connected with the first electronic device 101a through the first wireless communication.

In one embodiment, when a user input (e.g., allow) for allowing the second wireless communication connection between the first electronic device 101a and the at least one third electronic device 101b occurs in response to the message 23, the first electronic device 101a and the at least one third electronic device 101b may display a 10th screen 707 and an 11th screen 709, respectively. In one embodiment, the 10th screen 707 may be a form in which at least a portion of the above-described seventh screen 701 is changed. For example, as the first electronic device 101a and the at least one third electronic device 101b are connected to each other through the second wireless communication, identification information 21 of an external electronic device (e.g., the second electronic device 102 currently paired with the first electronic device 101a) displayed in the fifth interface 20 of the seventh screen 701 may be updated to identification information 21a indicating that the external electronic device can be operated by the at least one third electronic device 101b, and may be displayed on the 10th screen 707. Similarly, the 11th screen 709 displayed by the at least one third electronic device 101b may be a form in which at least a portion of the above-described eighth screen 703 is changed. For example, as the first electronic device 101a and the at least one third electronic device 101b are connected to each other through the second wireless communication, the sixth interface 22 displayed with a second effect on the eighth screen 703 may be updated to a seventh interface 22a displayed with a first effect and may be displayed on the 11th screen 709.

In one embodiment, when a user input (e.g., deny) for denying the second wireless communication connection between the first electronic device 101a and the at least one third electronic device 101b occurs in response to the message 23 within the ninth screen 705 displayed by the first electronic device 101a, the first electronic device 101a and the at least one third electronic device 101b may maintain and display the seventh screen 701 and the eighth screen 703, respectively.

Referring to FIG. 9, in the case in which the second condition is configured so that the user's approval of the first electronic device 101a is not required when the second wireless communication connection with the external electronic device is made on the first electronic device 101a, when receiving a request signal for establishing the second wireless communication from the at least one third electronic device 101b, the first electronic device 101a may transmit a corresponding ack, and may display the 10th screen (e.g., the 10th screen 707 of FIG. 7) described above through FIG. 7. In addition, the at least one third electronic device 101b may receive the ack transmitted by the first electronic device 101a, and may display the 11th screen (e.g., the 11th screen 709) described above through FIG. 7.

Figure 10:
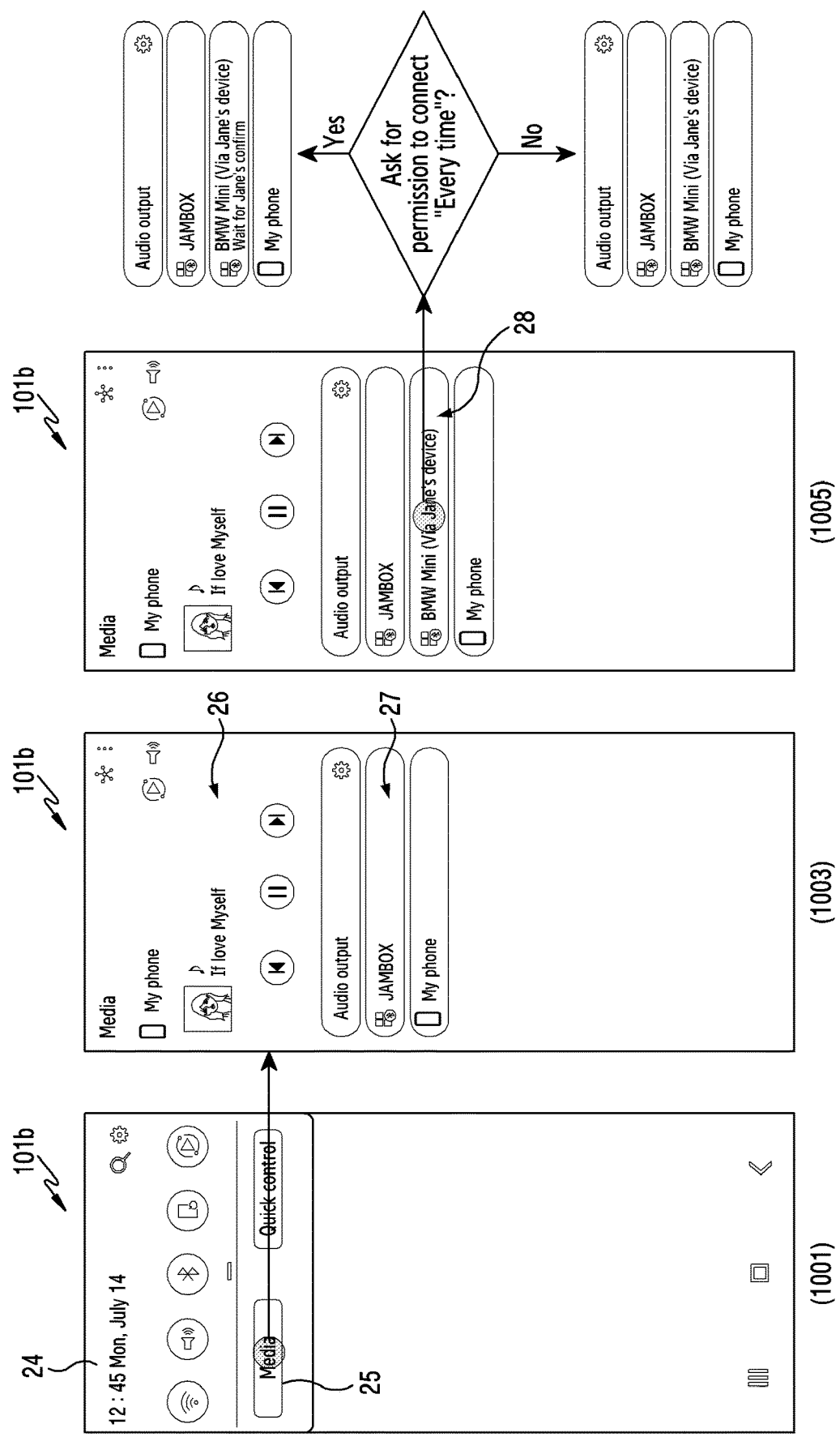
FIG. 10 is a diagram illustrating a screen related to multimedia content operation of a third electronic device according to an embodiment of the disclosure.

FIG. 10 is a diagram illustrating a screen related to multimedia content operation of a third electronic device according to an embodiment of the disclosure.

Referring to FIG. 10, the at least one third electronic device 101b may display a 12th screen 1001 for entering an execution screen of a multimedia application (e.g., video content playback application and/or audio content playback application) included in the at least one third electronic device 101b in response to user control. According to an embodiment, the 12th screen 1001 may include a quick panel 24, and a software button 25 indicating a multimedia application may be included in the quick panel 24.

In one embodiment, the at least one third electronic device 101b may display a 13th screen 1003 corresponding to the execution screen of the related multimedia application in response to a user input to the software button 25. According to an embodiment, the 13th screen 1003 may include at least one eighth interface for outputting (or playing) content included in the at least one third electronic device 101b. For example, the 13th screen 1003 may include at least one of an interface indicating identification information (e.g., My phone) of the at least one third electronic device 101b and identification information (e.g., JAMBOX) of at least one external electronic device having a connection history with the at least one third electronic device 101b through wired communication or wireless communication, as the at least one eighth interface capable of outputting the content.

According to an embodiment, when arbitrary content is played by the user of the at least one third electronic device 101b, at least one piece of information 26 corresponding to the arbitrary content may be further displayed on the 13th screen 1003. The at least one piece of information 26 may include at least one of, for example, attribute information (e.g., video or audio) of the content being played, content playback information (e.g., content playback time information, content profile information, and/or content jacket information), and/or application information supporting playback of the content.

In one embodiment, the eighth interface 27 related to the electronic device (e.g., JAMBOX) that currently outputs the content played by the at least one third electronic device 101b among the at least one third electronic device of which identification information is displayed through the at least one eighth interface may be displayed with a first effect (e.g., color, flashing, and/or highlight).

In one embodiment, the at least one third electronic device 101b may detect an advertisement signal transmitted from a first electronic device (e.g., the first electronic device 101a of FIG. 2, 3, or 4). For example, the at least one third electronic device 101b may detect a signal advertising a second electronic device (e.g., the second electronic device 102 of FIG. 2, 3, or 4) paired with the first electronic device 101a through first wireless communication (e.g., Bluetooth communication). In this case, the at least one third electronic device 101b may reflect a ninth interface 28 indicating identification information of the second electronic device 102 recognized based on the advertisement signal on the 13th screen 1003 to display a 14th screen 1005. According to an embodiment, the ninth interface 28 may be displayed with a second effect (e.g., black and white, non-flashing, and/or blur).

According to an embodiment, when receiving a user input to the ninth interface 28, the at least one third electronic device 101*b* may transmit a signal requesting a second wireless communication (e.g., Wi-Fi communication) connection with the first electronic device 101*a* to the first electronic device 101*a* that transmits the advertisement signal. According to an embodiment, according to a second condition (e.g., a condition related to a user's approval when the second wireless communication connection between the first electronic device 101*a* and an external electronic device is made) configured on the first electronic device 101*a*, the ninth interface 28 may be displayed with the first effect or may be maintained with a second effect being displayed. Alternatively, the ninth interface 28 may further display text waiting for permission of the first electronic device 101*a* while being maintained with the second effect.

Figure 11:
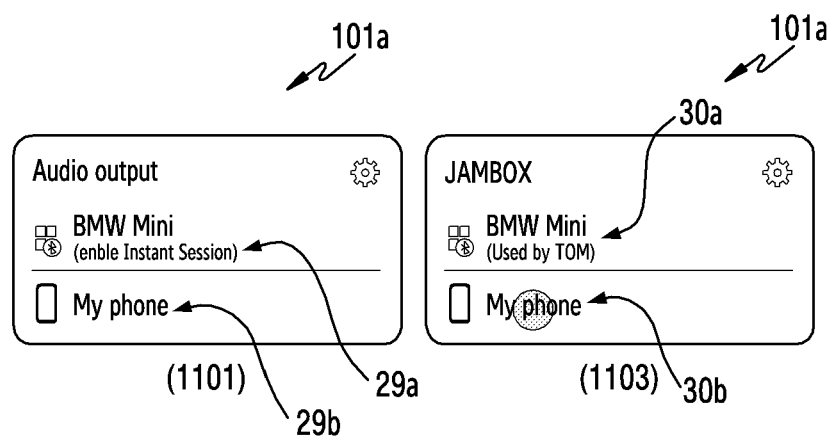
FIG. 11 is a diagram illustrating a screen related to multimedia content operation of a first electronic device according to an embodiment of the disclosure.

FIG. 11 is a diagram illustrating a screen related to multimedia content operation of a first electronic device according to an embodiment of the disclosure.

Referring to FIG. 11, an execution screen of a multimedia application included in the first electronic device 101*a* may include a 10th interface 1101 indicating identification information of at least one electronic device for outputting content of the first electronic device 101*a*. For example, the 10th interface 1101 may display at least one of identification information 29*a* of a second electronic device (e.g., the second electronic device 102 of FIG. 2, 3, or 4) paired with the first electronic device 101*a* through first wireless communication (e.g., Bluetooth communication) and identification information 29*b* of the first electronic device 101*a*, as identification information of the at least one electronic device for outputting the content. In the embodiment described with reference to FIG. 11, the content of the first electronic device 101*a* may be exemplified as being output through the second electronic device 102. Accordingly, the identification information 29*a* of the second electronic device 102 may be displayed with a first effect (e.g., color, flashing, and/or highlight).

In one embodiment, when at least one third electronic device (e.g., the third electronic device 101*b* of FIG. 2, 3, or 4) is connected to the first electronic device 101*a* through second wireless communication (e.g., Wi-Fi communication) to operate the second electronic device 102 paired with the first electronic device 101*a* through first wireless communication, at least a portion of the identification information 29*a* of the second electronic device 102 may be changed. For example, as in the 11th interface 1103, identification information 30*a* of the second electronic device 102 may be displayed while including text indicating that the second electronic device 102 is operated by the at least one third electronic device 101*b* or the user of the at least one third electronic device 101*b*.

In one embodiment, the first electronic device 101*a* may receive a user input for identification information 30*b* of the first electronic device 101*a* displayed on the 11th interface 1103. In this case, the first electronic device 101*a* may further output the content through an interface (e.g., the sound output device 155 and/or the display device 160 of FIG. 1) included in the first electronic device 101*a* while maintaining the content output through the second electronic device 102 connected through the first wireless communication.

Figure 12:
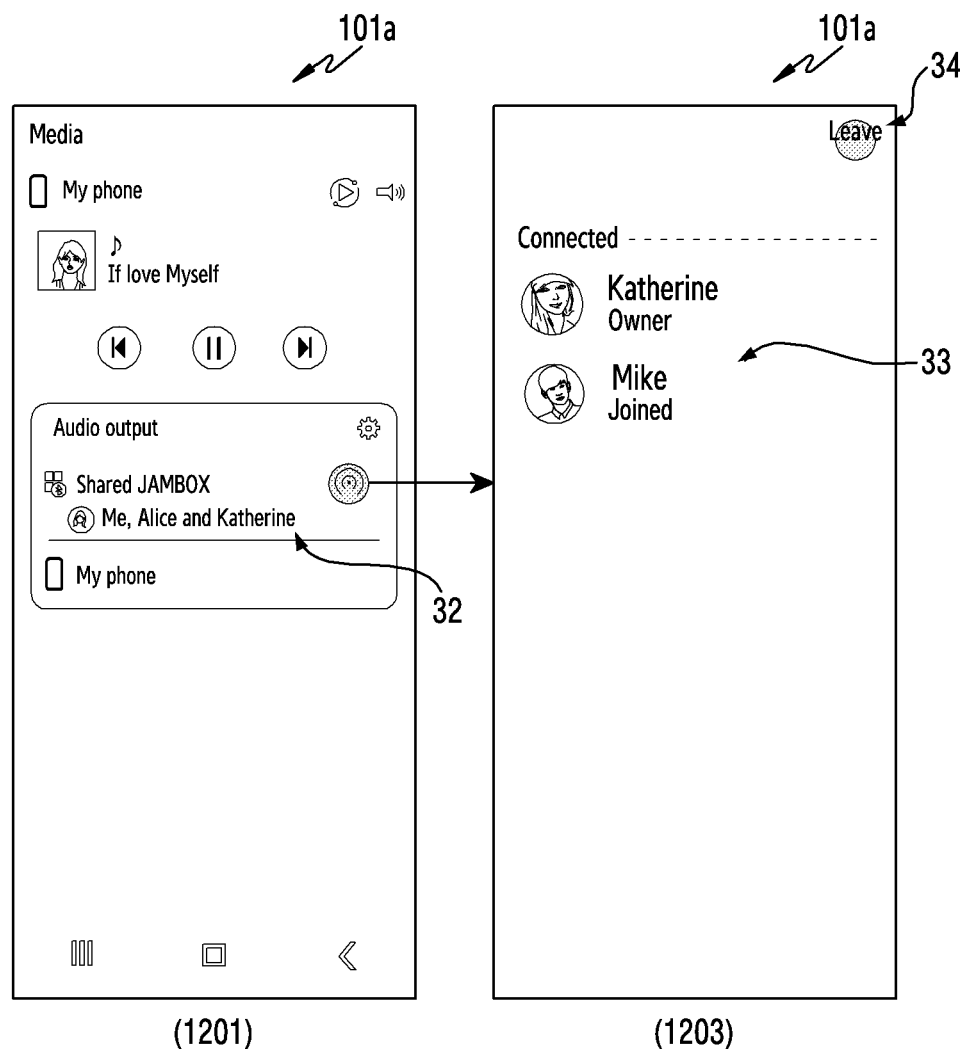
FIG. 12 is a diagram illustrating a form of releasing an instant session function of a first electronic device according to an embodiment of the disclosure.

FIG. 12 is a diagram illustrating a form of releasing an instant session function of a first electronic device according to an embodiment of the disclosure.

Referring to FIG. 12, in response to a user input to a 15th screen 1201, which is an execution screen of a multimedia application included in the first electronic device 101*a*, the first electronic device 101*a* may selectively release an instant session function with at least one third electronic device (e.g., the third electronic device 101*b* of FIG. 2, 3, or 4) interacting with the first electronic device 101*a* through the instant session function. In this regard, the 15th screen 1201 may include a 12th interface 32 that displays identification information of the at least one third electronic device 101*b* accessing a second electronic device 102 (e.g., the second electronic device 102 of FIG. 2, 3, or 4) paired with the first electronic device 101*a* through the first electronic device 101*a*. When receiving a user input to the 12th interface 32, the first electronic device 101*a* may switch the 15th screen 1201 to a 16th screen 1203. In one embodiment, the 16th screen 1203 may include a list 33 of users of the at least one third electronic device 101*b* accessing the second electronic device 102. In one embodiment, the first electronic device 101*a* may receive a user input for selecting at least one user in the list and then selecting a designated software button 34. In this case, the first electronic device 101*a* may release second wireless communication (e.g., Wi-Fi communication) with the at least one third electronic device 101*b* corresponding to the selected at least one user. Alternatively, the first electronic device 101*a* may not transmit data received from the at least one third electronic device 101*b* corresponding to the selected at least one user to the second electronic device 102 without releasing the second wireless communication with the at least one third electronic device 101*b* corresponding to the selected at least one user.

Figure 13:
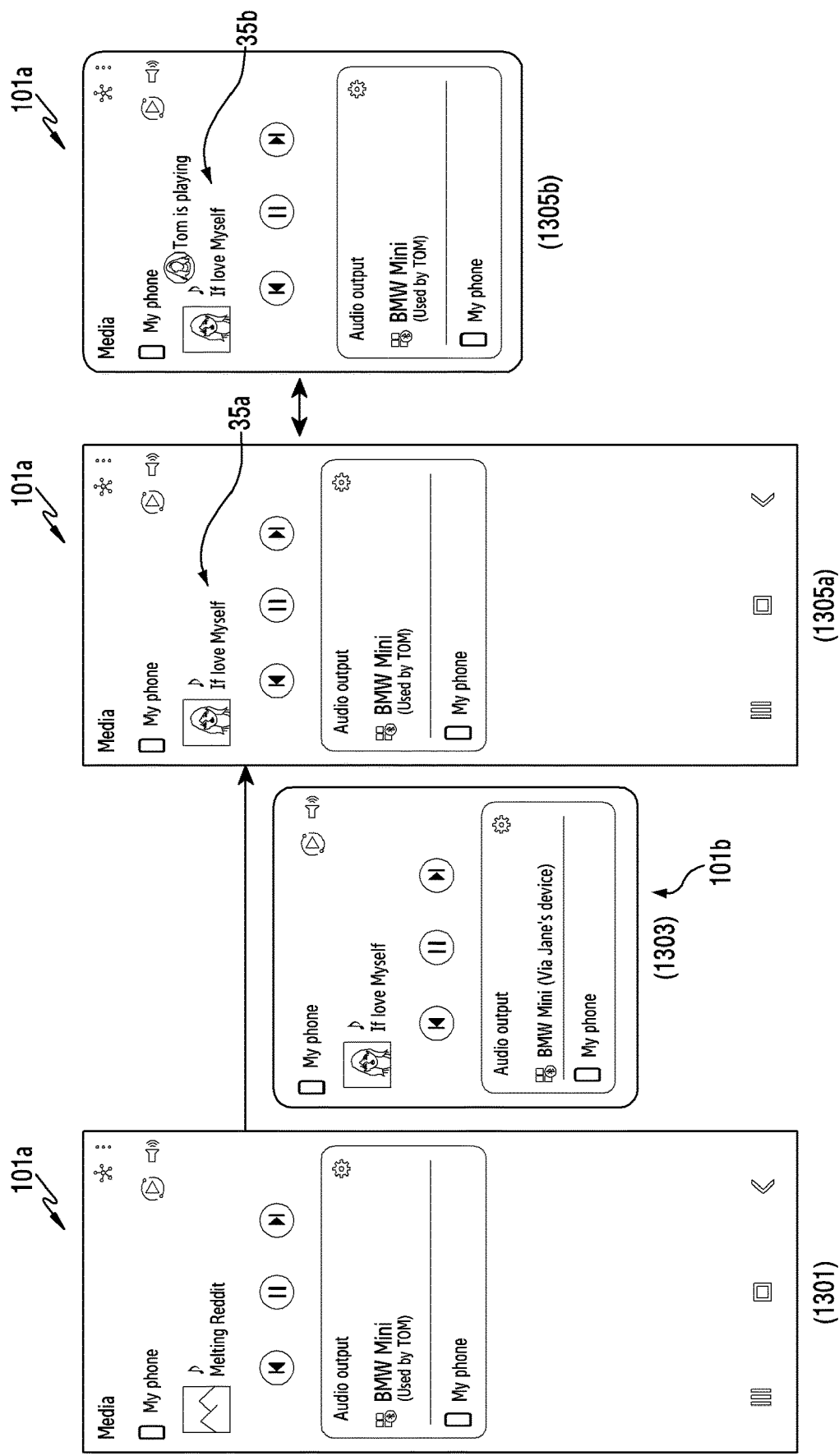
FIG. 13 is a diagram illustrating a screen output by a first electronic device according to relaying of the first electronic device for a second electronic device and a third electronic device according to an embodiment of the disclosure.

FIG. 13 is a diagram illustrating a screen output by a first electronic device according to relaying of the first electronic device for a second electronic device and a third electronic device according to an embodiment of the disclosure.

Referring to FIG. 13, the first electronic device 101*a* may output content of the first electronic device 101*a* through a second electronic device (e.g., the second electronic device 102 of FIG. 2, 3, or 4) connected through first wireless communication (e.g., Bluetooth communication). Accordingly, on a 17th screen 1301 corresponding to the execution screen of the multimedia application of the first electronic device 101*a*, at least one piece of information on the content output through the second electronic device 102 and identification information (e.g., BMW Mini) of the second electronic device 102 may be displayed with a first effect (e.g., color, flashing, and/or highlight).

In one embodiment, the second electronic device 102 connected to the first electronic device 101*a* through the first wireless communication may be operated by at least one third electronic device (e.g., the third electronic device 101*b* of FIG. 2, 3, or 4) in which second wireless communication (e.g., Wi-Fi communication) with the first electronic device 101*a* is established. For example, the at least one third electronic device 101*b* may detect an advertisement signal of the second electronic device 102 transmitted by the first electronic device 101*a*, may output an 18th screen 1303 including identification information of the second electronic device 102, and may establish second wireless communication with the first electronic device 101*a* in response to a user input for the identification information of the second electronic device 102 included in the 18th screen 1303. The at least one third electronic device 101*b* may transmit first data to the first electronic device 101*a* through the second wireless communication, thereby controlling at least a part of content being output by the second electronic device 102 or outputting content included in the third electronic device 101*b* through the second electronic device 102. In this case, the identification information of the second electronic device 102 displayed on the 17th screen 1301 of the first electronic device 101*a* may be changed (or updated) to include text indicating that the second electronic device 102 is operated by the at least one third electronic device 101*b*, and the 17th screen 1301 may be changed or switched to a 19th screen 1305*a* reflecting the change (or update).

According to an embodiment, the 19th screen 1305*a* may include (or display) at least a part of first data transmitted to the first electronic device 101*a* by the at least one third electronic device 101*b* to operate the second electronic device 102. Alternatively, the 19th screen 1305*a* may include (or display) at least a part of second data generated by the first electronic device 101*a* to correspond to the first data. For example, the 19th screen 1305*a* may include information 35*a* of content that is controlled or output by the at least one third electronic device 101*b* through the second electronic device 102. The information 35*a* of the content may include at least one of, for example, attribute information of the content (e.g., video or audio), content playback information (e.g., content playback time information, content profile information, and/or content jacket information), and/or application information supporting content playback. In various embodiments, the 19th screen 1305*a* may be replaced with a 20th screen 1305*b* that further includes text and/or image indicating identification information of the third electronic device 101*b* or user information 35*b* of the third electronic device 101*b*, in addition to the information 35*a* of the content that is controlled or output by the at least one third electronic device 101*b* through the second electronic device 102.

An electronic device according to the above-described various embodiments may include: a first communication circuit configured to support first wireless communication; a second communication circuit configured to support second wireless communication of a communication protocol different from the first wireless communication; a display; and a processor configured to be operatively connected to the first communication circuit, the second communication circuit, and the display.

According to various embodiments, the processor may be configured to: perform the first wireless communication with a first external electronic device using the first communication circuit; display a first screen including first information indicating a connection of the first wireless communication with the first external electronic device using the display; perform the second wireless communication with a second external electronic device using the second communication circuit while performing the first wireless communication with the first external electronic device; display a second screen including second information indicating that at least a portion of the first external electronic device is operable by the second external electronic device using the display; receive first data related to the operation of the at least a portion of the first external electronic device from the second external electronic device based on the second wireless communication; generate second data based on the first data; and transmit the second data to the first external electronic device based on the first wireless communication.

According to various embodiments, the processor may be configured to: perform Bluetooth communication with the first external electronic device, as at least a part of the performing of the first wireless communication with the first external electronic device; and perform Wi-Fi communication with the second external electronic device, as at least a part of the performing of the second wireless communication with the second external electronic device.

According to various embodiments, the processor may be configured to activate a designated function capable of supporting access of the second external electronic device to the first external electronic device, as at least a part of the performing of the second wireless communication with the second external electronic device.

According to various embodiments, the processor may be configured to transmit a signal including identification information of the first external electronic device using the second wireless communication, as at least a part of the performing of the second wireless communication with the second external electronic device.

According to various embodiments, the processor may be configured to identify a first condition configured by a user input in relation to the transmission of the signal and to encrypt and transmit the signal based on the first condition, as at least a part of the transmitting of the signal.

According to various embodiments, the processor may be configured to receive data for controlling at least a part of content output by the first external electronic device, as at least a part of the receiving of the first data from the second external electronic device.

According to various embodiments, the processor may be configured to receive data for outputting content included in the second external electronic device from the first external electronic device, as at least a part of the receiving of the first data from the second external electronic device.

According to various embodiments, the processor may be configured to generate the second data in a data format of a specification that can be identified by the first external electronic device based on the first data.

According to various embodiments, the electronic device may further include a memory.

According to various embodiments, the processor may be configured to: store the second data in a volatile region of the memory; and remove the second data from the volatile region when a designated time elapses after transmitting the second data to the first external electronic device.

According to various embodiments, the processor may be configured to: receive a signal requesting a connection of the second wireless communication from the second external electronic device; identify a second condition configured by a user input in relation to the reception of the signal; and display a message inquiring whether to allow access of the second external electronic device to the first external electronic device using the display based on the second condition, as at least a part of the performing of the second wireless communication with the second external electronic device.

An electronic device according to the above-described various embodiments may include a communication circuit configured to support first wireless communication; a display; and a processor configured to be operatively connected to the communication circuit and the display.

According to various embodiments, the processor may be configured to: detect a signal transmitted from a first external electronic device performing second wireless communication of a communication protocol different from the first wireless communication by performing signal scanning; display a first screen including an interface capable of requesting access to a second external electronic device performing the second wireless communication with the first external electronic device using the display; perform the first wireless communication with the first external electronic device using the communication circuit; and transmit first data related to the access to the second external electronic device to the first external electronic device based on the first wireless communication.

According to various embodiments, the processor may be configured to: receive a user input to the interface; and transmit a signal requesting a connection of the first wireless communication with the first external electronic device to the first external electronic device in response to the reception of the user, as at least a part of the performing of the first wireless communication with the first external electronic device.

According to various embodiments, the processor may be configured to display the interface with a designated first effect when the first wireless communication with the first external electronic device is established.

According to various embodiments, the processor may be configured to transmit, to the first external electronic device, data for controlling at least a part of content output by the second external electronic device or data for outputting content included in the electronic device by the second external electronic device, as at least a part of the transmitting of the first data to the first external electronic device.

A method for transmitting data based on multiple communication schemes which is performed by an electronic device according to the above-described various embodiments may include: performing first wireless communication with a first external electronic device using a first communication circuit supporting the first wireless communication; displaying a first screen including first information indicating a connection of the first wireless communication with the first external electronic device using a display; performing second wireless communication with a second external electronic device using a second communication circuit supporting the second wireless communication of a communication protocol different from the first wireless communication while performing the first wireless communication with the first external electronic device; displaying a second screen including second information indicating that at least a portion of the first external electronic device is operable by the second external electronic device using the display; receiving first data related to the operation of the at least a part of the first external electronic device from the second external electronic device based on the second wireless communication; generating second data based on the first data; and transmitting the second data to the first external electronic device based on the first wireless communication.

According to various embodiments, the performing of the first wireless communication may include performing Bluetooth communication with the first external electronic device.

According to various embodiments, the performing of the second wireless communication may include performing Wi-Fi communication with the second external electronic device.

According to various embodiments, the performing of the second wireless communication may include activating a designated function capable of access of the second external electronic device to the first external electronic device.

According to various embodiments, the performing of the second wireless communication may include transmitting a signal including identification information of the first external electronic device using the second wireless communication.

According to various embodiments, the transmitting of the signal may include: identifying a first condition configured by a user input in relation to the transmission of the signal; and encrypting and transmitting the signal based on the first condition.

According to various embodiments, the receiving of the first data may include any one of receiving data for controlling at least a part of content output by the first external electronic device and receiving data for outputting content included in the second external electronic device by the first external electronic device.

According to various embodiments, the performing of the second wireless communication may include: receiving a signal requesting a connection of the second wireless communication from the second external electronic device; identifying a second condition configured by a user input in relation to the reception of the signal; and displaying a message inquiring whether to allow access of the second external electronic device to the first external electronic device using the display based on the second condition.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first communication circuit configured to support a first wireless communication;
   a second communication circuit configured to support a second wireless communication of a communication protocol different from the first wireless communication;
   a display; and
   a processor configured to be operatively connected to the first communication circuit, the second communication circuit, and the display,
   wherein the processor is further configured to:
      perform the first wireless communication with a first external electronic device using the first communication circuit,
      display a first screen including first information indicating a connection of the first wireless communication with the first external electronic device using the display,
      perform the second wireless communication with a second external electronic device using the second communication circuit while performing the first wireless communication with the first external electronic device,
      display a second screen including second information indicating that at least a portion of the first external electronic device is operable by the second external electronic device using the display,
      receive first data related to an operation of the at least the portion of the first external electronic device from the second external electronic device based on the second wireless communication,
      generate second data based on the first data, and
      transmit the second data to the first external electronic device based on the first wireless communication.

2. The electronic device of claim 1, wherein, as at least a part of the performing of the first wireless communication with the first external electronic device, the processor is further configured to:
   perform Bluetooth communication with the first external electronic device, and
   perform Wi-Fi communication with the second external electronic device, as at least a part of the performing of the second wireless communication with the second external electronic device.

3. The electronic device of claim 1, wherein, as at least a part of the performing of the second wireless communication with the second external electronic device, the processor is further configured to:
   activate a designated function capable of supporting access of the second external electronic device to the first external electronic device.

4. The electronic device of claim 1, wherein, as at least a part of the performing of the second wireless communication with the second external electronic device, the processor is further configured to:
   transmit a signal including identification information of the first external electronic device using the second wireless communication.

5. The electronic device of claim 4, wherein, as at least a part of the transmitting of the signal, the processor is further configured to:
   identify a first condition configured by a user input in relation to the transmission of the signal, and
   encrypt and transmit the signal based on the first condition.

6. The electronic device of claim 1, wherein, as at least a part of the receiving of the first data from the second external electronic device, the processor is further configured to:
   receive data for controlling at least a part of content output by the first external electronic device.

7. The electronic device of claim 1, wherein, as at least a part of the receiving of the first data from the second external electronic device, the processor is further configured to:

receive data for outputting content included in the second external electronic device from the first external electronic device.

8. The electronic device of claim 1, wherein the processor is further configured to generate the second data in a data format of a specification that can be identified by the first external electronic device based on the first data.

9. The electronic device of claim 8, further comprising:
a memory,
wherein the processor is further configured to:
store the second data in a volatile region of the memory, and
remove the second data from the volatile region when a designated time elapses after transmitting the second data to the first external electronic device.

10. The electronic device of claim 1, wherein, as at least a part of the performing of the second wireless communication with the second external electronic device, the processor is further configured to:
receive a signal requesting a connection of the second wireless communication from the second external electronic device,
identify a second condition configured by a user input in relation to the reception of the signal, and
display a message inquiring whether to allow access of the second external electronic device to the first external electronic device using the display based on the second condition.

11. An electronic device comprising:
a communication circuit configured to support a first wireless communication;
a display; and
a processor configured to be operatively connected to the communication circuit and the display,
wherein the processor is further configured to:
detect a signal transmitted from a first external electronic device performing a second wireless communication of a communication protocol different from the first wireless communication by performing signal scanning,
display a first screen including an interface capable of requesting access to a second external electronic device performing the second wireless communication with the first external electronic device using the display,
perform the first wireless communication with the first external electronic device using the communication circuit, and
transmit first data related to an access to the second external electronic device to the first external electronic device based on the first wireless communication.

12. The electronic device of claim 11, wherein, as at least a part of the performing of the first wireless communication with the first external electronic device, the processor is further configured to:
receive a user input to the interface, and
transmit a signal requesting a connection of the first wireless communication with the first external electronic device to the first external electronic device in response to the reception of the user input.

13. The electronic device of claim 11, wherein the processor is further configured to:
display the interface with a designated first effect when the first wireless communication with the first external electronic device is established.

14. The electronic device of claim 11, wherein, as at least a part of the transmitting of the first data to the first external electronic device, the processor is further configured to:
transmit, to the first external electronic device, data for controlling at least a part of content output by the second external electronic device or data for outputting content included in the electronic device by the second external electronic device.

15. A method for transmitting data based on multiple communication schemes which is performed by an electronic device, the method comprising:
performing a first wireless communication with a first external electronic device using a first communication circuit supporting the first wireless communication;
displaying a first screen including first information indicating a connection of the first wireless communication with the first external electronic device using a display;
performing a second wireless communication with a second external electronic device using a second communication circuit supporting the second wireless communication of a communication protocol different from the first wireless communication while performing the first wireless communication with the first external electronic device;
displaying a second screen including second information indicating that at least a portion of the first external electronic device is operable by the second external electronic device using the display;
receiving first data related to an operation of the at least a part of the first external electronic device from the second external electronic device based on the second wireless communication;
generating second data based on the first data; and
transmitting the second data to the first external electronic device based on the first wireless communication.

16. The method of claim 15,
wherein the performing of the first wireless communication comprises performing Bluetooth communication with the first external electronic device, and
wherein the performing of the second wireless communication comprises performing Wi-Fi communication with the second external electronic device.

17. The method of claim 15, wherein the performing of the second wireless communication comprises activating a designated function capable of access of the second external electronic device to the first external electronic device.

18. The method of claim 15,
wherein the performing of the second wireless communication comprises transmitting a signal including identification information of the first external electronic device using the second wireless communication, and
wherein the transmitting of the signal comprises identifying a first condition configured by a user input in relation to the transmission of the signal, and encrypting and transmitting the signal based on the first condition.

19. The method of claim 15, wherein the receiving of the first data comprises any one of:
receiving data for controlling at least a part of content output by the first external electronic device; and
receiving data for outputting content included in the second external electronic device by the first external electronic device.

20. The method of claim 15, wherein the performing of the second wireless communication comprises:

receiving a signal requesting a connection of the second wireless communication from the second external electronic device;

identifying a second condition configured by a user input in relation to the reception of the signal; and displaying a message inquiring whether to allow access of the second external electronic device to the first external electronic device using the display based on the second condition.

* * * * *